United States Patent
Muto et al.

(10) Patent No.: US 6,822,803 B2
(45) Date of Patent: Nov. 23, 2004

(54) OPTICAL COMPONENT WITH MULTIPLE GLASS OPTICAL ELEMENTS AND MANUFACTURING METHOD THEREOF

(75) Inventors: Hiroyasu Muto, Saitama (JP);
Katsunori Mukasa, Saitama (JP);
Masaaki Fukuda, Saitama (JP);
Yasuhiko Sato, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 8 days.

(21) Appl. No.: 10/386,222

(22) Filed: Mar. 11, 2003

(65) Prior Publication Data

US 2003/0184873 A1 Oct. 2, 2003

(30) Foreign Application Priority Data

Mar. 26, 2002  (JP) .................................... 2002-086497

(51) Int. Cl.[7] .......................... G02B 27/10; B29D 11/00
(52) U.S. Cl. ..................... 359/642; 359/619; 264/1.32
(58) Field of Search ............................... 359/619, 620, 359/642; 264/1.32

(56) References Cited

U.S. PATENT DOCUMENTS 5,208,700 A * 5/1993 Harris et al. ................ 359/569
5,214,535 A * 5/1993 Harris et al. ................ 359/565
2002/0075568 A1 * 6/2002 Lissotschenko ............. 359/642
2003/0107815 A1 * 6/2003 Redmond ................... 359/619
2003/0184872 A1 * 10/2003 Muto et al. ................. 359/642

FOREIGN PATENT DOCUMENTS

| JP | 2003277076 A | * 10/2003 | ........... C03B/11/00 |
| JP | 2003277084 A | * 10/2003 | ........... C03B/23/03 |
| JP | 2003277085 A | * 10/2003 | ........... C03B/23/03 |

* cited by examiner

*Primary Examiner*—Ricky Mack
(74) *Attorney, Agent, or Firm*—Jordan and Hamburg LLP

(57) ABSTRACT

The present invention relates to an optical component in which a plurality of glass optical elements are integrated thus improving the productivity and providing consistent quality. The optical component of the present invention comprises a plurality of lens parts 1 which is formed from glass material by press molding, a tubular leg part 2 which is formed during the press molding, and which bends at and extends downward from the periphery of the lens part 1, a planar part 3 which bends outwardly and extends horizontally from the tubular leg part 2 providing connection to other lens parts 1, and the cover glass 4 of the image sensor chip 5, which is fixed onto the lower surface of the planar part 3, and/or image sensor chip 5 which is disposed below the lens part 1.

6 Claims, 5 Drawing Sheets

F I G. 3
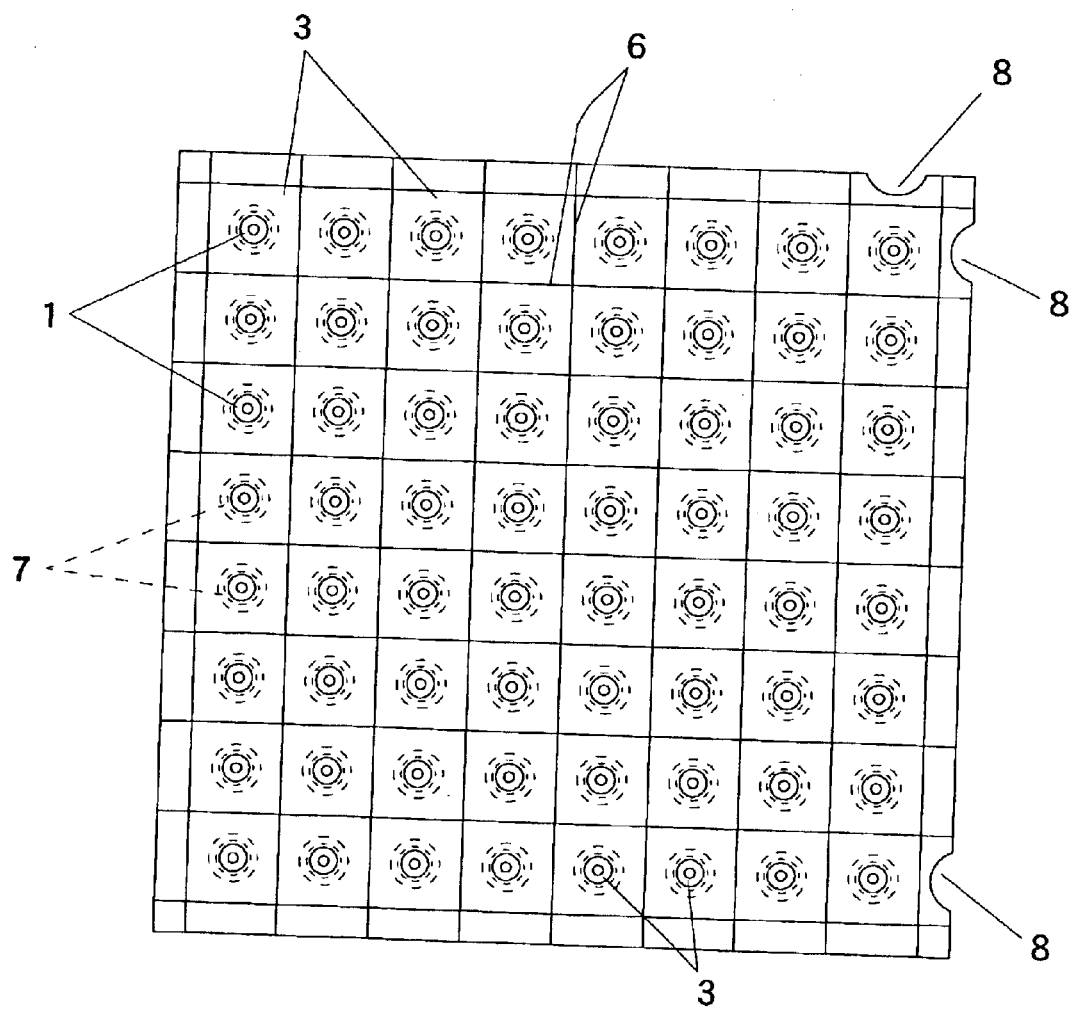

F I G. 5
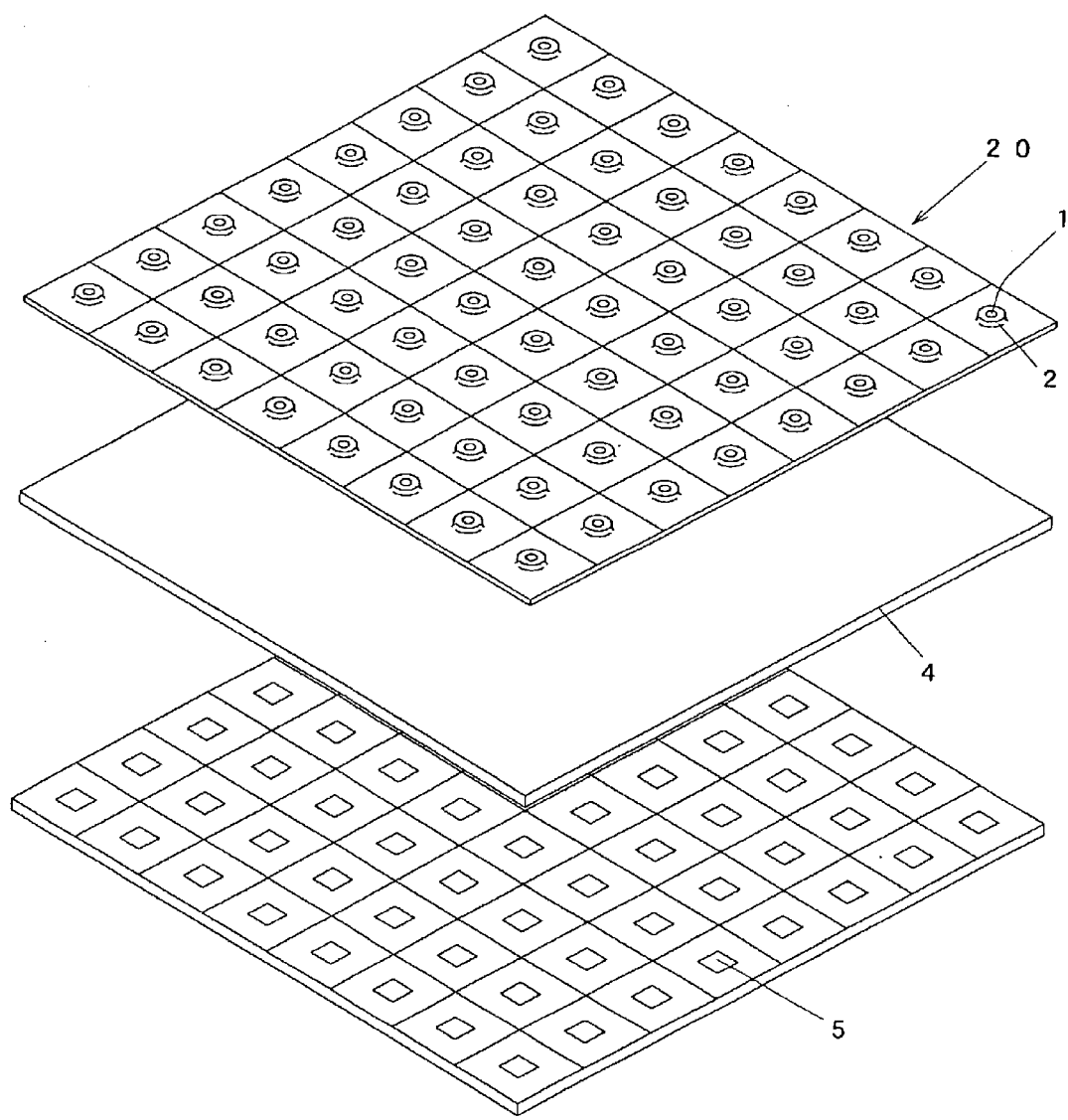

F I G. 6
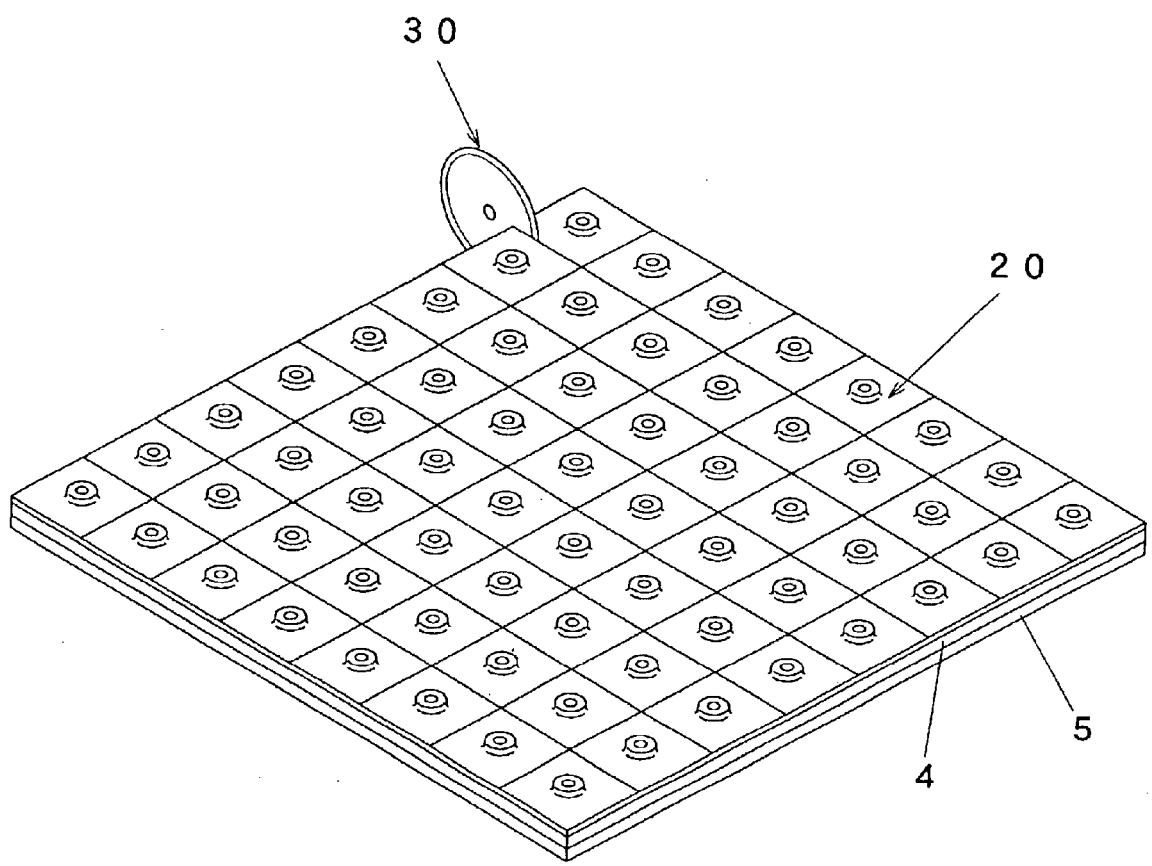

OPTICAL COMPONENT WITH MULTIPLE GLASS OPTICAL ELEMENTS AND MANUFACTURING METHOD THEREOF

BACKGROUND OF THE INVENTION

1. Field of the Invention

The present invention relates to a sheet-like optical component which integrates an image sensor chip such as a CCD and CMOS and/or cover glass placed on the chip with a glass optical element in multiple numbers, and to the manufacturing method of the same.

2. Description of the Related Art

Conventional optical components, such as one called a "microlens", are manufactured one by one by melting and thereby softening a spherical glass material (a glass preform) and pressing it with molding dies having a shaping surface which forms the optical surface of the lens to be produced.

To convert thus manufactured lens 100 into an optical component in which the lens is combined with an image sensor chip 101 and cover glass 103, it has been necessary to incorporate the lens 100 and cover glass 103 into a lens barrel 102 in correspondence with the image sensor chip 101 as shown in FIG. 1.

As described above, in manufacturing a conventional optical component, each of lens, cover glass, image sensor chip must be manufactured separately in respective processes and then incorporated into a lens barrel, and this has caused a low productivity and also a problem in quality stability of, for example, positioning accuracy in the incorporation of the parts into the lens barrel.

SUMMARY OF THE INVENTION

Accordingly, it is the object of the present invention to provide an optical component having a plurality of glass optical elements, in which the plurality of glass optical elements are formed into one piece thus improving the productivity and providing consistent quality, and a manufacturing method thereof.

To achieve the above described object, the present invention comprises: a plurality of lens parts which are formed from glass material by press molding; a tubular leg part which is formed during the press molding, and which bends at and extends downward from the periphery of the lens part; a planer part which bends outwardly and extends horizontally from the tubular leg part providing connection to other lens parts; and the cover glass of the image sensor chip, which is fixed onto the lower surface of the planar part, and/or image sensor chip which is disposed below the lens part. According to the invention, a plurality of glass optical elements can be manufactured at the same time thus improving the productivity. Further, since the image sensor chip and the glass optical element, or the cover glass of the image sensor chip and the glass optical element are integrated, it is possible to obtain optical components of consistent quality by cutting each of them separately.

Further, the manufacturing method according to the present invention comprises the steps of: forming an integral glass sheet of multiple optical elements consisting of: a plurality of lens parts, a tubular leg part which bends at and extends downwardly from the periphery of said lens part, and a planer part which bends outwardly and extends horizontally from said tubular leg part providing connection to other lens parts; fabricating an integral sheet of multiple optical components by fixing cover glass and/or image sensor chips in a registered state onto the lower surface of the planar part of said integral glass sheet of multiple optical elements, and cutting said integral sheet of optical components to cut away plurality of optical components. According to the method of the present invention, it is possible to significantly improve the productivity and to cut costs.

BRIEF DESCRIPTION OF THE DRAWINGS

FIG. 3 is a plain view;

FIG. 5 is a perspective view to show the process step of fixing the lens sheet, cover glass, and the image sensor chip together; and FIG. 6 is a perspective view to show the step of cutting the sheet obtained through the fixing step as shown in FIG. 5.

DETAILED DESCRIPTION OF THE PREFERRED EMBODIMENTS

Figure 1:
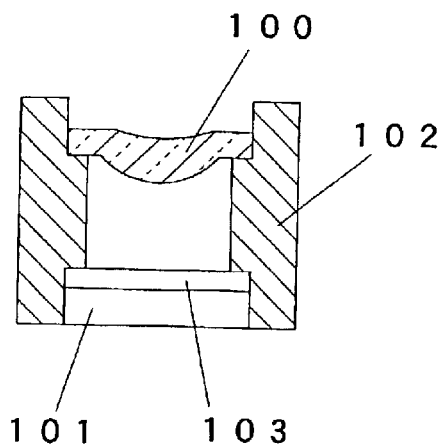
FIG. 1 is a sectional view to show a prior art example.

Hereinbelow, preferred embodiments of the present invention will be described referring to the drawings.

Figure 2:
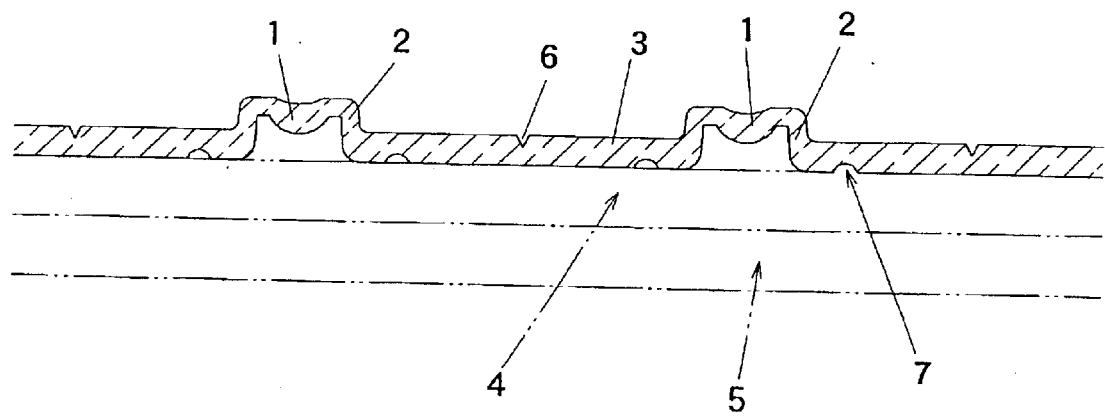
FIG. 2 is an enlarged sectional view of FIG. 3 to show a preferred embodiment of the present invention.

FIG. 2 is a partially enlarged sectional view of an embodiment shown in FIG. 3, which comprises a lens part 1, a tubular leg part 2 which bends at and extends from the periphery of the lens part 1, a planar part 3 which bends outwardly and extends horizontally from the tubular leg part 2 providing connection to other lens parts 1, cover glass 4 which is fixed onto the lower surface of the planar part 3, and an image sensor chip 5 located under the cover glass 4 and arranged to correspond to the focus of the lens part 1. In FIG. 1, the cover glass 4 and the image sensor chip 5 are shown in a simplified manner. The image sensor chip 5 may also be disposed below the cover glass 4 after cutting away one by one portions of the lens part 1 of the sheet in which a plurality of glass optical elements and cover glass 4 are integrated. Alternatively, the image sensor chips 5 may be fixed directly to the planer part 3 without providing the cover glass 4.

The above described lens part 1, tubular leg part 2, planar part 3 are formed from glass material by press molding. The planar part 3 connecting the multiple lens parts 1 is provided with a cutting allowance for separating the multiple lens parts 1 into multiple pieces, and cutting lines 6 for cutting the cutting allowance portion are formed on the upper surface of the planar part 3. In this embodiment, although the cutting lines 6 were formed so as to cut the portion of the lens parts 1 into single pieces, the location for forming the cutting lines 6 may be changed for the cases in which the lens parts 1 are used as a pair, or as a set of three or more depending on applications. The cover glass 4 and the planar part 3 are bonded with an adhesive, and a circular recess 7 to be applied with an adhesive is provided on the lower surface of the planar part 3 so that the adhesive would not flow out to the side of the lens part 1. In this embodiment, multiple glass optical elements with a lens part 1, a tubular leg part 2, and a planar part 3 are press molded; and thereafter, the cover glass 4 and the planar part 3 are bonded with an adhesive utilizing the recess 7.

FIG. 3 is a plain view of the whole structure, showing that eight glass optical elements are formed in longitudinal and lateral directions respectively. Also there are formed two position markings 8 on one side of the rectangle and a similar positioning marking 8 on one of the adjacent sides of the forgoing side and near the end closer to the forgoing marking 8. These markings 8 are utilized to position the image sensor chip 5 with precision against each lens part 1.

Figure 4:
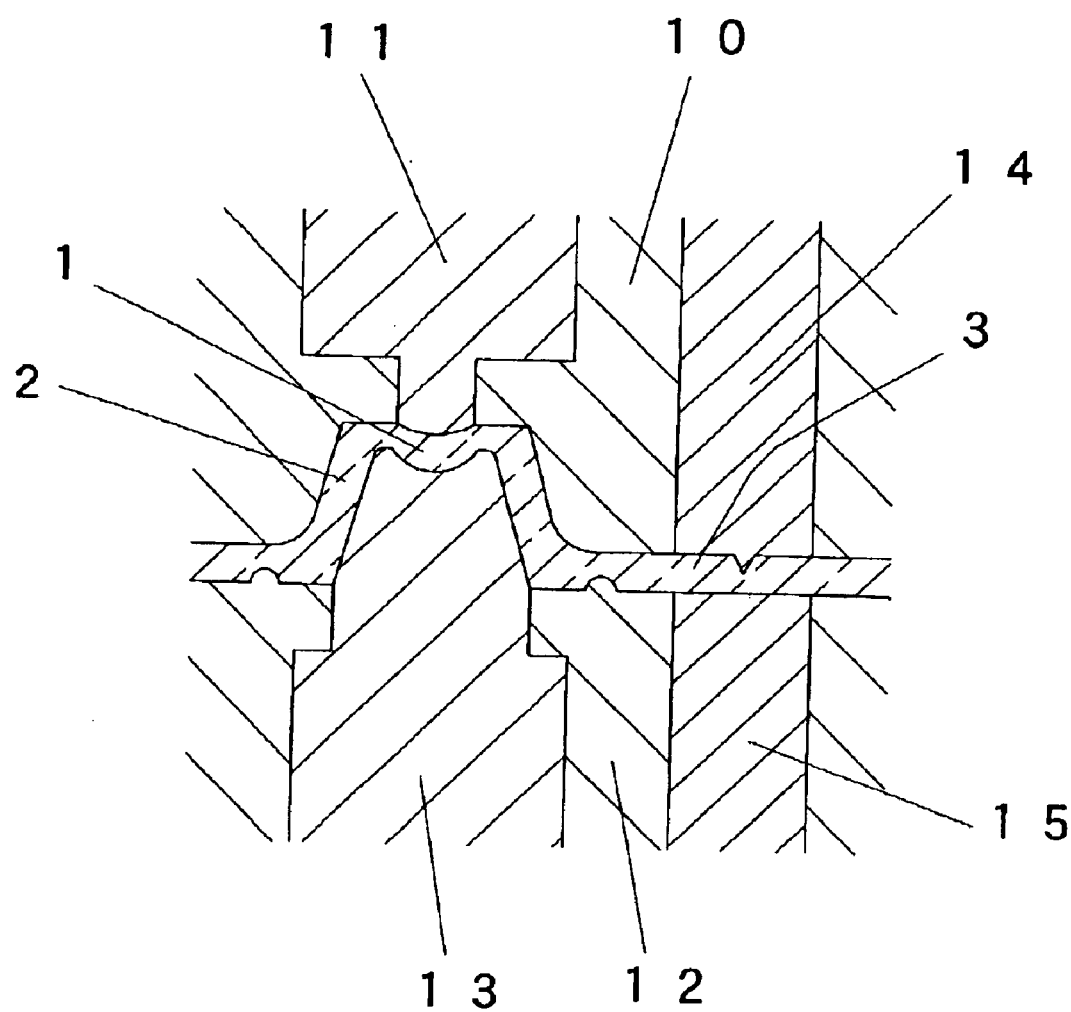
FIG. 4 is an enlarged sectional view to show dies for press molding.

FIG. 4 is a sectional view to show the region including a lens part 1 in an exemplary state of the press molding. The figure shows that there are provided an upper core 11 in an upper die 10, a lower core 13 in the lower die 12, and upper and lower partition dies 14, 15 surrounding the upper and lower dies 10, 12. Glass material is placed in a molten and softened state between the upper/lower dies 10, 12 and upper/lower partition dies 14, 15, and then pressed by tightening the upper/lower dies 10, 12, upper/lower partition dies 14, 15, and the upper/lower cores 11, 13 to fabricate a sheet-like piece in which a plurality of glass optical elements are integrated as shown in FIG. 2. The glass material to be used may be $SiO_2$-alkaline oxides-alkaline earth oxides or other various optical glass materials. The front end surface of each upper and lower cores 11, 13 is formed into a shape extending along the desired spherical surface of the lens part 1.

The sheet-like piece (lens sheet) 20 which is molded as described above and into which a plurality of lenses are integrated is taken out from the molding dies and transferred to the fixing step as shown in FIG. 5. In the fixing step, the cover glass 4 and image sensor chip 5 are adhesively secured (fixed) to the lens sheet 20 in a registered state. The term "registered state" means a state in which the optical axis of individual lens of the sheet-like piece (lens sheet 20) substantially corresponds to the center of each element of the image sensor chip 5. Thus adhesively secured (fixed) lens sheet 20, cover glass 4, and image sensor chip 5 are transformed into an integral sheet of multiple optical component as one unit and held with a retaining member (not shown).

In a state held as described above, the integral sheet undergoes a cutting step in which individual optical components are cut away with a cutter 30 as shown in FIG. 6 in such a way that one lens corresponds to one image sensor chip 1.

In an optical component manufactured through the above described process steps, the lens, cover glass 4, and image sensor chip 5 have already been integrally fixed to one another. Furthermore, since these lenses are preformed with a tubular leg part 2, which corresponds to a lens barrel 102 of prior art, and a planar part 3 which bends outwardly and extends horizontally from the leg part 2, there is no need to incorporate them into the lens barrel afterward and this will allow an improvement in productivity. In view of positioning accuracy, if the positioning of the tubular leg part 2 and the planar part 3 against the image sensor chip 5 is accurately performed, there will be no need to consider the looseness between the lens barrel and the lens, and this will make it possible to improve the accuracy thereby stabilizing the quality.

What is claimed is:

1. An optical component with multiple glass optical elements, comprising:

a plurality of lens parts being formed from glass material by press molding;

a tubular leg part being formed during the press molding, the tubular leg part bending at and extending downwardly from the periphery of the lens part;

a planer part bending outwardly and extending horizontally from the tubular leg part, providing connection to other lens parts; and a cover glass of image sensor chip fixed onto the lower surface of the planar part, and/or an image sensor chip disposed below the lens part.

2. The optical component with multiple glass optical elements according to claim 1, wherein a cutting allowance is provided on said planar part for separating said plurality of lens parts into multiple pieces.

3. The optical component with multiple glass optical elements according to claim 1, wherein a cutting allowance is provided on said planar part for separating said plurality of lens parts into multiple pieces, and a cutting line is provided on the upper surface of the planar part for cutting the cutting allowance.

4. The optical component with multiple glass optical elements according to claim 1, wherein a recess is provided on the lower surface of the planar part adjacent to the point where the planar part bends from the tubular leg part, the recess being applied with an adhesive in order to fix the planar part to the cover glass or the image sensor chip.

5. The optical component with multiple glass optical elements according to claim 1, wherein a cutting allowance is provided on said planar part for separating said plurality of lens parts into multiple pieces, and a recess is provided on the lower surface of the planar part adjacent to the point where the planar part bends from the tubular leg part, the recess being applied with an adhesive in order to fix the planar part to the cover glass or the image sensor chip.

6. An optical component with multiple glass optical elements according to claim 1, wherein a cutting allowance is provided on said planar part for separating said plurality of lens parts into multiple pieces; a cutting line is provided on the upper surface of the planar part for cutting the cutting allowance; a recess is provided on the lower surface of the planar part adjacent to the point where the planar part bends from the tubular leg part, the recess being applied with an adhesive in order to fix the planar part to the cover glass or the image sensor chip.

* * * * *